S. O. PAXTON.
CORN HARVESTER.
APPLICATION FILED DEC. 13, 1916.
1,310,133.
Patented July 15, 1919.
3 SHEETS—SHEET 1.
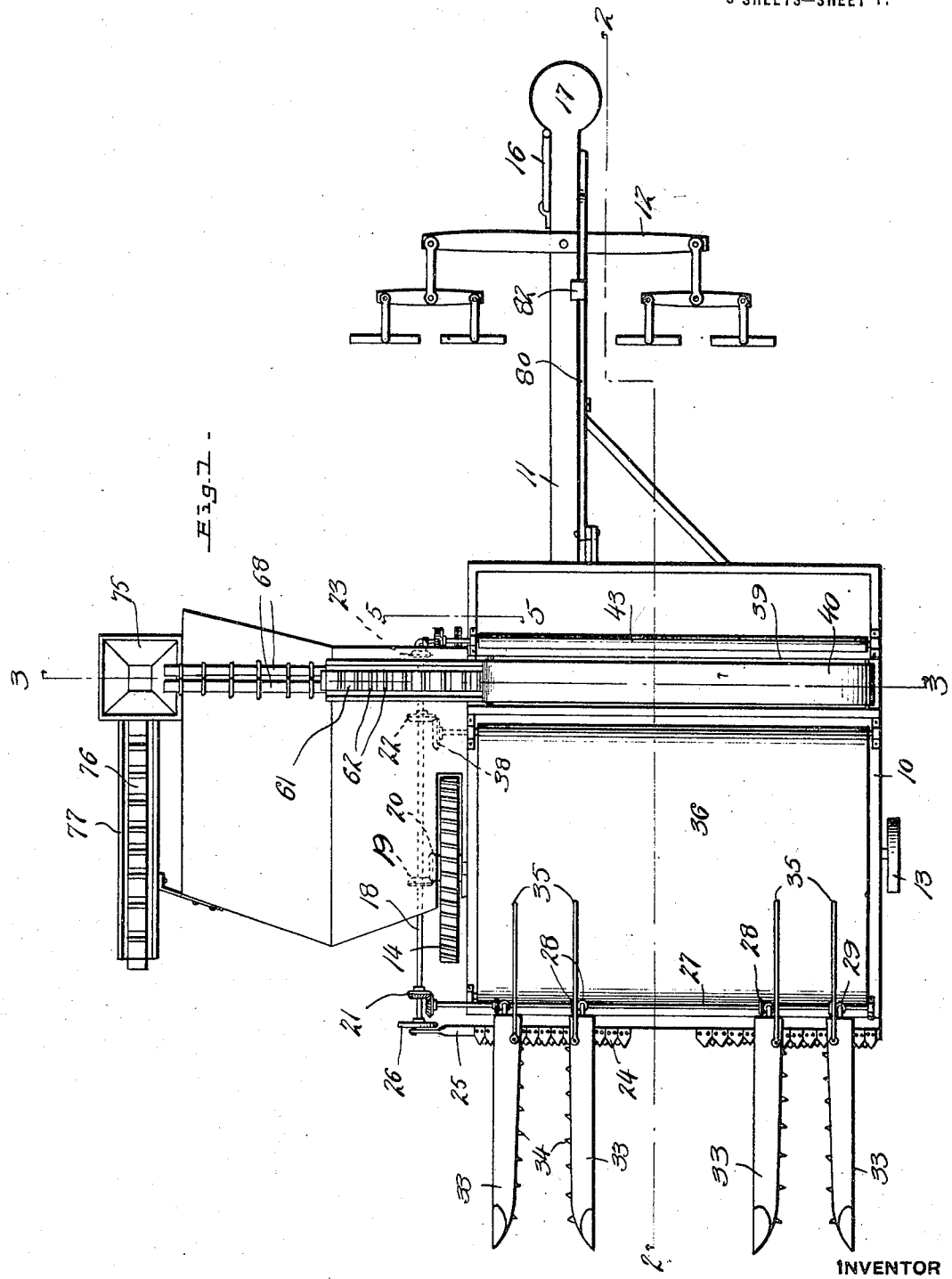
INVENTOR
Samuel O. Paxton
WITNESSES
ATTORNEY

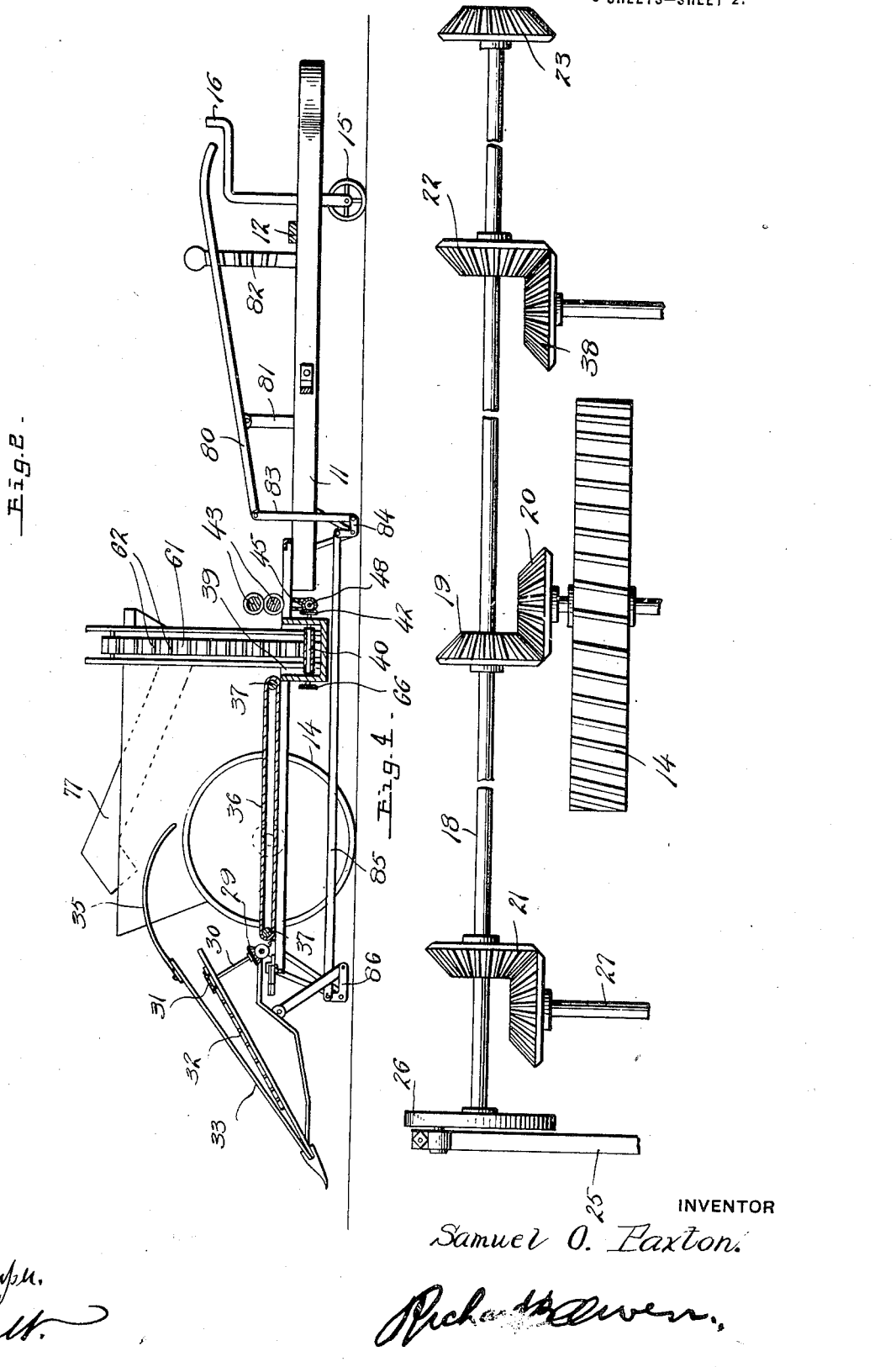

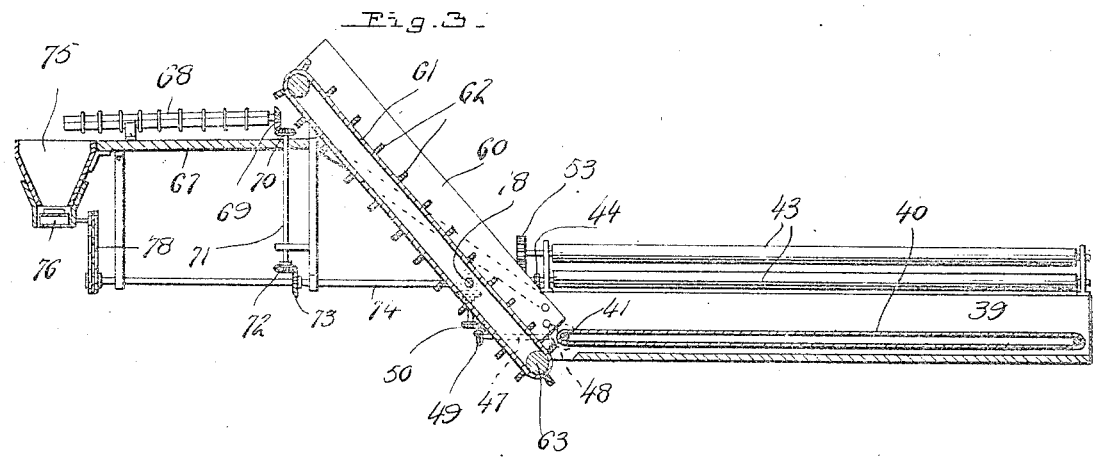
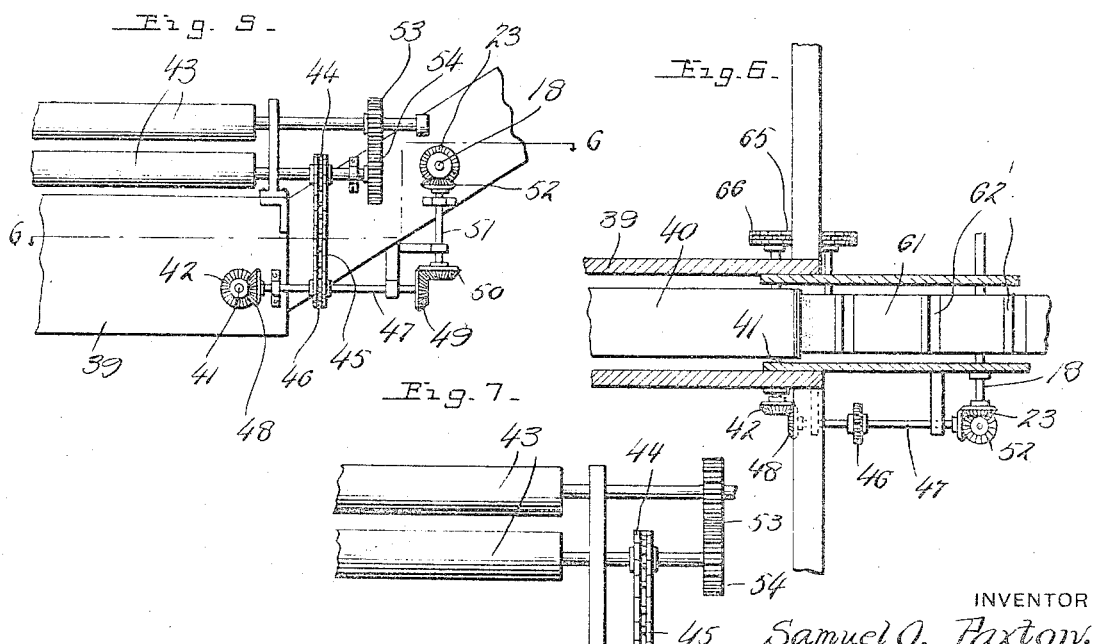

UNITED STATES PATENT OFFICE.

SAMUEL O. PAXTON, OF ROSEDALE, KANSAS.

CORN-HARVESTER.

1,310,133.　　　　Specification of Letters Patent.　　Patented July 15, 1919.

Application filed December 13, 1916. Serial No. 136,711.

*To all whom it may concern:*

Be it known that I, SAMUEL O. PAXTON, a citizen of the United States, residing at Rosedale, in the county of Wyandotte and State of Kansas, have invented certain new and useful Improvements in Corn-Harvesters, of which the following is a specification.

This invention relates to harvesting machines, and particularly to corn harvesters.

The primary object of the invention is to provide a harvesting machine by the use of which standing stalks in a corn field may be cut, the corn ears removed from the stalks, the husk removed from the ears, and the ears delivered to the wagon or other receptacle. A still further object of the invention is to provide a device of this character, and for the purposes specified which is capable of being readily manipulated within the corn field, and which is positive in operation.

Still further objects reside in providing a device of this character which is of simple construction, which is positive in operation, which is capable of perfectly performing the various functions set forth, and which is of comparatively light weight.

With these objects in view, together with others which will appear as the description proceeds, the invention resides in the novel formation, combination, and arrangement of parts, all as will be described more fully hereinafter, illustrated in the drawings, and particularly pointed out in the claim.

In the drawings:—

Figure 1 is a top plan view of a machine constructed and arranged in accordance with the invention;

Fig. 2 is a longitudinal sectional view taken through the machine substantially upon line 2—2 of Fig. 1;

Fig. 3 is a transverse sectional view taken through the machine substantially upon line 3—3 of Fig. 1;

Fig. 4 is a detail view illustrating the means for transmitting power from the bull wheel to the various independent mechanisms upon the machine;

Fig. 5 is a fragmentary rear elevation taken upon line 5—5 of Fig. 1;

Fig. 6 is a sectional plan view taken substantially upon line 6—6 of Fig. 5; and Fig. 7 is a fragmentary elevation illustrating the manner in which the ear severing rolls are operated.

Referring now more particularly to the drawings, 10 indicates the body of the harvesting machine, which comprises a relatively large substantially rectangular frame as shown. Projecting rearwardly from this frame and at one side thereof is a draft beam 11, to which draft apparatus indicated at 12, is attached to enable the device to be pushed by draft animals. The frame is supported at one side by a ground wheel 13, and a bull wheel 14 supports the other side by which power is developed for the machinery to be hereafter detailed. The draft pole or beam 11 is supported upon a rudder wheel 15, the latter being capable of being steered by a crank or handle 16 within convenient reach of an operator standing upon the platform 17.

Mounted in suitable bearings beyond one end of the body and adjacent the bull wheel 14 is a shaft 18, which derives its rotation through a bevel gear 19 carried thereby intermeshing with a similar gear 20 affixed to the bull wheel 14. The shaft 18 has affixed thereto at certain intervals, bevel gears 21, 22, and 23, the purposes of which will be pointed out hereinafter.

Arranged upon the forward edge of the body of the vehicle is a cutter mechanism indicated generally at 24 and which may be of any approved type. The cutting blades for this mechanism are reciprocated through a pitman 25 connected eccentrically to a disk or wheel 26 affixed to the forward end of the power shaft 18.

Extending transversely of the body of the vehicle and at the forward end thereof is a shaft 27, upon which at certain intervals are secured bevel gears 28, the latter intermeshing with similar gears 29 secured to the lower ends of jack shafts 30. These jack shafts extend forwardly and upwardly from the frame, and carry suitable sprockets 31 at their outer ends for moving gatherer chains 32. These gatherer chains are supported upon gatherers 33 arranged in spaced relation at the forward end of the machine and projecting from the latter. The chains are equipped with outwardly extending fingers 34 to grip the stalks of standing corn as the vehicle advances. The gatherers are hingedly supported at their rear ends upon the shaft 27, and are capable of moving with said shaft as a pivot. Each of the gatherer members is provided with a rearwardly extending arm 35, to prevent the stalks falling so as to be disposed laterally of the vehicle. It will be observed particularly with reference to Fig. 1, that the cutter mechanisms are arranged below and directly beneath the gatherers. As the vehicle advances, the rows of standing stalks will be collected between the pairs of gathers 33 and will be severed by the cutting mechanism, and as the machine advances, the stalks thus severed will be prevented from falling laterally by the arms 35.

Disposed horizontally within the frame 10 and covering the greater portion of the latter is a traveling belt or apron 36. This apron or conveyer passes over rollers 37 arranged adjacent the forward and rear ends of the vehicle, and the rearmost roller derives its rotary movement through the bevel gear 38 intermeshing with the bevel gear 22 affixed to the power shaft 18.

Immediately in the rear of the rear belt 37 and disposed transversely of the vehicle frame is a trough indicated generally at 39, and within which a laterally traveling conveyer 40 is arranged. This trough is of narrow width, and extends throughout the lateral extent of the frame. The conveyer or belt 40 located at the bottom of the trough 39, derives its motion through a shaft 41 at one side of the frame 10, the said shaft being equipped with a bevel gear 42.

Journaled in suitable bearings arranged at the opposite sides of the frame 10, and immediately in the rear of the trough 39 are superimposed rollers 43. These rollers extend throughout the width of the frame, and are spaced apart a relatively small distance as shown. The lowermost of the rollers carries at one end a sprocket 44 over which is passed a chain 45, the said chain passing also over a sprocket 46 secured to a shaft 47 rotatably mounted below the said rollers. The shaft 47 carries at each end bevel gears 48 and 49 respectively, the former being intermeshed with the bevel gear 42 on the supporting shaft 41 of the conveyer belt 40. The gear 49 intermeshes with a similar gear 50 carried at the lower end of a vertically disposed shaft 51, the latter having a bevel gear 52 at its upper end intermeshing with the gear 23 at the rear end of the power shaft 18. Intermeshing gears 53—54 upon the shafts of the rollers 43 operate to transmit movement from the lower roller to the upper roller. From the gearing and shaft construction last detailed, it is obvious that rotary movement of the power shaft 18 will transmit movement to the belt 40 through the bevel gears 42—48, and the chain 45 will rotate the lowermost of the rollers 43. The gears 54—53 upon the rollers will operate to turn the uppermost of the said rollers in a reverse direction from that of the lower roller.

Projecting laterally and upwardly from the vehicle at the delivery end of the conveyer 40 and in alinement therewith is a trough 60, within which a conveyer 61 is arranged. This conveyer may be in the form of a belt as shown, having parallel projecting members 62 for carrying corn ears upwardly. The belt passes over lower and upper rollers 63—64, the former of which derives rotary movement from a belt or chain 65 passing over a sprocket 66 on the shaft 41.

The upper end of the inclined conveyer 61 projects above a table 67 arranged beyond the vehicle frame, and upon which spaced parallel husking rollers 68 are rotatably mounted. These rollers are alined with the belt 61, and are adapted to receive corn ears conveyed by the said belt. The rollers 68 receive rotary movement through intermeshing bevel gears 69 and 70 on one of the said rollers and a shaft 71 respectively, the said shaft receiving movement through a bevel gear 72 intermeshing with a similar gear 73 affixed to a laterally extending shaft 74. The shaft 74 may receive its rotary movement from the power shaft 18.

Arranged below the outermost ends of the husking rollers 68 is a hopper 75 within which the husked corn ears are to be deposited. This hopper communicates at its lower end with one end of a conveyer 76 arranged within a suitable trough 77 projecting forwardly and upwardly from the table. This conveyer 76 is driven from the shaft 74 through a belt 78. The forward end of the trough 77 is adapted to communicate with a vehicle, so that corn after being husked will be deposited therein.

From the foregoing, it is apparent that when the vehicle is moved forwardly standing stalks will be directed by the gatherers 33 against the cutters 24. The stalks when cut are deposited upon the conveyer 36 with their tassel or top ends pointing rearwardly of the vehicle. The stalks thus positioned are carried rearwardly, and the top ends pass between the rollers 43. As the corn ear is considerably larger than the stalk and projects at its uppermost end beyond the stalk, the said ear will be engaged by one of the rollers and torn loose from the stalk. The stalk will be passed beyond the rear of the vehicle, and the loose ear will be deposited upon the conveyer 40 of the trough 49. The conveyer moves in the direction of the arrow indicated on Fig. 1, and the ears will be deposited upon the elevating conveyer 61. The ear is then delivered to the husking rollers 68, and the ribs upon the said rollers will remove the husk from the ear as it slowly passes to the outer ends of the rollers. It will be observed that the rollers incline downwardly toward their outermost ends, so that the ear will be deposited in the hopper 75. The conveyer 76 passing beneath the open end of the hopper will receive the husked ears and convey them forwardly and into the vehicle with which the machine is adapted to be associated.

Should it be desired to raise the gatherer members, the lever 80 pivoted upon the post 81 projecting upwardly from the beam 11 may be moved downwardly over the rack 82, whereupon upward movement will be delivered to a link 83, the latter rocking the bell crank 84 and operating through a connector or link 85 to force the bell crank 86 forwardly, whereby the link 87 connected to the gatherer will be moved upwardly. There may be a mechanism of the last described character associated with each of the gatherers, or the said gatherers may be so arranged as to be operated by the same lever.

What is claimed is:—

A corn harvester, comprising a wheeled frame having a transverse trough at its rear, cutting mechanism at the front end of the frame, an endless conveyer between the cutting mechanism and trough having its upper portion movable rearwardly, an endless conveyer operable in the trough, snapping rolls in the rear of the trough, an elevated platform at one side of the frame, husking rolls on the platform, an elevator for delivering the ears of corn on the platform and between the husking rolls, a hopper at the outer end of the husking rolls, and a conveyer for delivering the husked ears of corn from the hopper to the desired point of delivery.

In testimony whereof I affix my signature in presence of two witnesses.

SAMUEL O. PAXTON.

Witnesses:
WALTER E. SMITH,
JAKE FOUK, Jr.